United States Patent [19]

Tamura et al.

[11] Patent Number: 4,668,888
[45] Date of Patent: May 26, 1987

[54] COMMUTATOR ARRANGEMENT FOR A MINIATURE MOTOR

[75] Inventors: Hideo Tamura; Hisashi Shibata; Kenji Furuya, all of Matsudo, Japan

[73] Assignee: Mabuchi Motor Co.,Ltd., Japan

[21] Appl. No.: 888,737

[22] Filed: Jul. 21, 1986

[30] Foreign Application Priority Data

Jul. 25, 1985 [JP] Japan .......................... 60-114179[U]

[51] Int. Cl.⁴ ........................................... H02K 13/04
[52] U.S. Cl. .............................. 310/233; 310/40 MM; 310/42; 310/91
[58] Field of Search ........... 310/40 MM, 91, 233–237, 310/219, 232, 231, 261, 42; 29/597, 507

[56] References Cited

U.S. PATENT DOCUMENTS 1,901,955  3/1933  Giamo .................................... 29/597
3,042,998  7/1962  Sweet et al. ......................... 310/232
3,679,923  7/1972  Harper et al. ....................... 310/231

FOREIGN PATENT DOCUMENTS 2082849  3/1982  United Kingdom ................ 310/233

Primary Examiner—R. Skudy
Attorney, Agent, or Firm—McGlew and Tuttle

[57] ABSTRACT

A miniature motor having a rotor comprising a commutator having locating projections formed on the commutator reference surface coming in contact with a rotor core, and a rotor core having thereon locating key holes for engaging with the locating projections; the commutator being fitted to the rotor core by engaging the locating projections with the locating key holes until the commutator reference surface comes in contact with the rotor core; in which each of the locating projections has a temporary insertion portion at the tip thereof, whose cross-section is smaller than the cross-section of the locating key hole, and a full insertion portion for engaging with the locating key hole; the full insertion portion has such a length that the commutator tongue of the commutator is located at a position higher than the height of the rotor windings in a state where the temporary insertion portion is inserted into the locating key hole.

2 Claims, 11 Drawing Figures

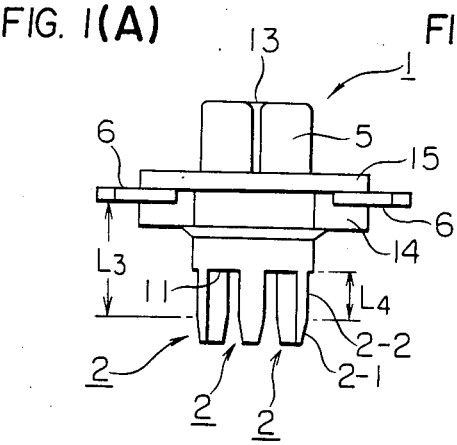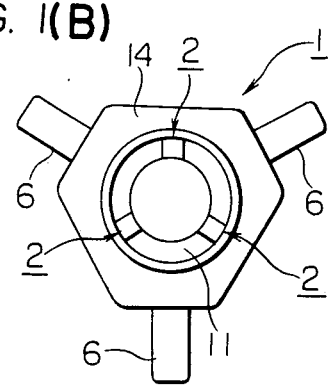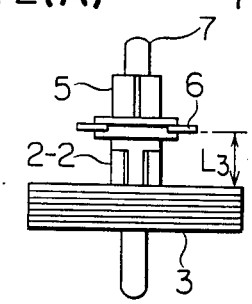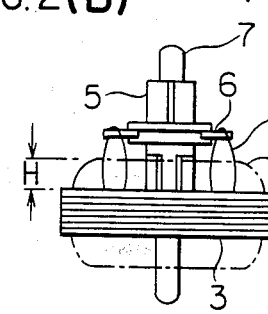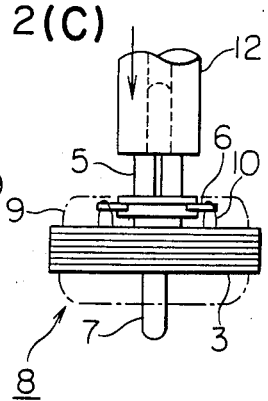

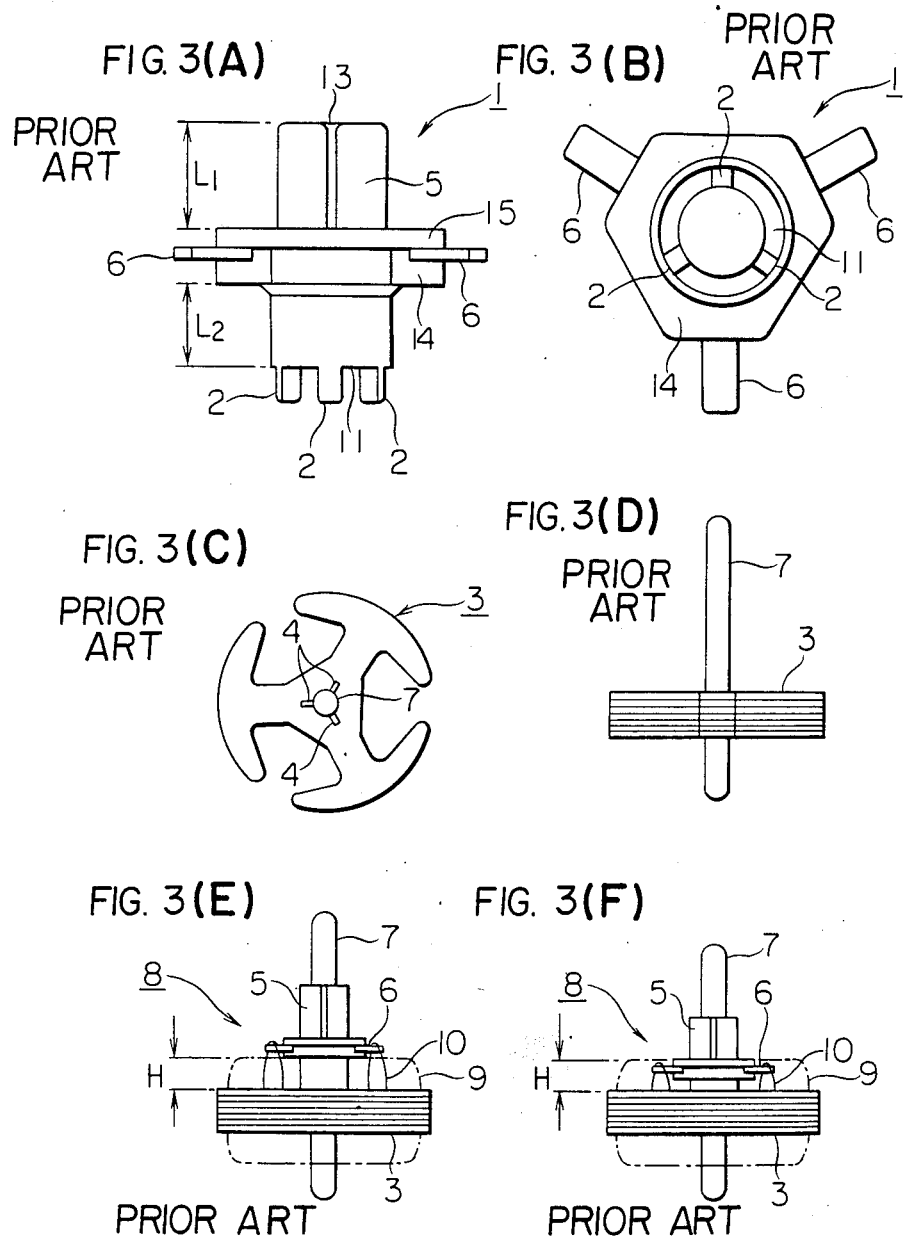

COMMUTATOR ARRANGEMENT FOR A MINIATURE MOTOR

BACKGROUND OF THE INVENTION

1. Field of the Invention

This invention relates generally to a miniature motor, and more specifically to a miniature motor having a rotor constructed so as to enable the angular positioning of a commutator and a rotor core by engaging locating projections provided on the commutator with locating key holes provided on the rotor core, in which the locating projections are engaged with the locating key holes in two steps to enable to automate the winding of rotor windings, the connection of the ends of the rotor windings to the commutator tongues, and the mounting of the commutator on the rotor.

2. DESCRIPTION OF THE PRIOR ART

In miniature motors having brushes and a commutator, in which power is fed to rotor windings via the brushes and the commutator, the relative angular positions of the rotor core and the commutator are usually predetermined. In such a miniature motor, therefore, locating projections 2 are provided on a commutator 1, as shown in FIGS. 3 (A) and (B), and locating key holes (hereinafter referred to as key holes) 4 for engaging with the locating projections (hereinafter referred to as projections) 2 are provided on a rotor core 3, as shown in FIG. 3 (C); the projections 2 being engaged with the key holes 4 to accurately position the commutator 1 with respect to the rotor core 3. FIGS. 3 (A) and (B) are front and bottom views of the commutator, FIGS. 3 (C) and (D) are plan and side views of the rotor core, and FIGS. 3 (E) and (F) are front views of the rotor, respectively. In the figure, reference numerals 1 refers to a commutator; 2 to a projection; 3 to a rotor core; 4 to a key hole; 5 to a commutator segment; 6 to a commutator tongue; 7 to a rotor shaft; 8 to a rotor; 9 to a rotor winding; 10 to a winding end; and 11 to a commutator reference surface; 13 to a column made of an insulating material; 14 to an enlarged portion, made of an insulating material; and 15 to a washer, respectively.

When winding the rotor winding 9 on the rotor core, as shown in FIG. 3 (E), is is desirable, in terms of improved productivity in the manufacture of the rotor, to wind the rotor winding 9 on the rotor core 3 in a state where the commutator 1 is mounted in advance on the rotor 8, so that the winding end 10 can be temporarily attached to the commutator tongue 6 during the aforementioned winding operation. In order to make it possible to include the operation of attaching the winding end 10 to the commutator tongue 6 during the winding operation, the commutator tongue 6 must be located at a position higher than the height of the winding (shown by an arrow H), as shown in FIG. 3 (E). To achieve this, the length (shown by an arrow $L_2$ in FIG. 3 (A)) of a commutator portion below the enlarged portion 14 is made larger than the winding height H.

With the increased need for thinner miniature motors in recent years, however, various means for making the rotor thinner have been conceived. As one of such means, it has been conceived that the commutator segment length (shown by an arrow $L_1$) and the aforementioned length $L_2$ of the commutator 1 shown in FIG. 3 (E) are reduced to the minimum. If the length $L_2$ is reduced, however, the position of the commutator tongue 6 tends to be lower than the winding height H, as shown in FIG. 3 (F), posing difficulties in the above-mentioned winding operation. To overcome this problem, the winding operation is usually performed in the following three methods.

(i) As shown in FIG. 3 (E), the commutator 1 is press-fitted to the rotor shaft 7 until the commutator tongue 6 reaches a position higher than the winding height H, and then the projections 2, 2 and 2 (shown in FIG. 3 (A)) are positioned almost above the key holes 4, 4 and 4 (shown in FIG. 3 (C))(at this time each projection 2 has not yet been inserted into each key hole 4). In this state, the winding operation, including the operation of attaching the winding end 10 to the commutator tongue 6, is performed. After the winding operation is completed, the commutator 1 is forced toward the rotor core 3 and each projection 2 is inserted into each key hole 4 until the commutator reference surface 11 (shown in FIG. 3 (A)) comes in contact with the rotor core 3.

(ii) After the rotor winding is wound on the rotor core 3, the commutator 1 is fitted to the rotor, and then the winding end 10 is connected to the commutator tongue 6.

(iii) Though not shown in the figures, a locating knurled portion is provided on the rotor shaft, instead of the projections 2 and the key holes 4. The rotor winding and commutator fitting operations are similar to those in (i) above.

In the foregoing, the rotor winding and commutator fitting operations for the conventional miniature motors have been described. These methods, however, have the following unwanted problems.

In the method (i), when mounting the commutator 1 on the rotor after the rotor winding operation, merely pushing the commutator 1 toward the rotor core 3 may result in a mismatching between the projections 2 and the key holes 4. The commutator 1 must therefore be forced toward the rotor core 3, while adjusting the relative positions of the projections 2 and the key holes 3. This tends to deteriorate working efficiency.

In the method (ii), the rotor winding operation is performed independently of the operation of attaching the winding end 10 to the commutator tongue 6. This not only deteriorates working efficiency but also makes it difficult to position the projections 2 and the key holes 4, as in the case of the method (i).

Furthermore, in the method (iii), an additional knurling operation is required, increasing the manufacturing manhours.

SUMMARY OF THE INVENTION

This invention is intended to overcome the aforementioned problems.

To this end, the miniature motor of this invention is characterized in that each of locating projections has at the tip thereof a temporary insertion portion having a crosssection smaller than the crosssection of key holes, and a full insertion portion for inserting into the key hole; the full insertion portion having such a length that the commutator tongues of the commutator are located at a position higher than the height of the rotor winding in a state where the temporary insertion portion is inserted into the locating key hole.

These and other objects of this invention will become apparent from the following description taken in conjunction with FIGS. 1 and 2.

BRIEF DESCRIPTION OF THE DRAWING

FIGS. 1 (A) and (B) are front and bottom views of a commutator used in a miniature motor embodying this invention.

FIGS. 2 (A) (B) and (C) are diagrams of assistance in explaining the commutator fitting and rotor winding operations according to this invention.

FIGS. 3 (A) through (F) are diagrams of assistance in explaining a rotor used in a conventional miniature motor.

DETAILED DESCRIPTION OF THE EMBODIMENT

In FIGS. 1 (A) and (B) and FIGS. 2 (A) through (C), reference numeral 2-1 refers to a temporary insertion portion; 2—2 to a full insertion portion; 12 to a commutator pushing jig, and other numerals correspond with like numerals in FIG. 3.

A projection 2 in a commutator 1 used in the miniature motor of this invention comprises a temporary insertion portion 2-1 which is temporarily inserted into a key hole 4 provided on a rotor core 3 during the rotor winding operation (the rotor core 3 and the key hole 4 are the same as used in the conventional miniature motor shown in FIG. 3 (C)), and a full insertion portion 2—2 which is inserted into the key hole after the rotor winding operation has been finished (the full insertion portion 2—2 is not inserted into the key hole during the rotor winding operation). An arrow $L_3$ shown in FIG. 1 (A) represents the distance between the rotor core 3 and the commutator tongue 6 during the rotor winding operation. The length (shown by an arrow $L_4$) of the full insertion portion 2—2 is determined so that the distance $L_3$ becomes larger than the winding height H. The fact that the position of the commutator tongue 6 is higher than the winding height H makes it easy to perform the winding operation of the rotor winding 9, including the attaching of the winding end to the commutator tongue 6. When mounting the commutator 1 at a predetermined position (at the position shown in FIG. 2 (C), which will be described later) after the rotor winding operation, the commutator 1 can be easily and accurately mounted at the predetermined position merely by pushing the commutator 1 toward the rotor core 3 because the temporary insertion portion 2-1 has already been inserted into the key hole 4 during the rotor winding operation, while maintaining the relative angular positions of the commutator 1 and the rotor core 3. The winding operation of the rotor winding 9 and the mounting operation of the commutator 1 will be described in more detail in the following, referring to FIGS. 2 (A) through (C).

First, the commutator 1 shown in FIG. 1 is fitted to the rotor shaft 7, and the temporary insertion portion 2-1 formed at the tip of the project 2 on the commutator 1 is inserted into the key hole 4 (shown in FIG. 3 (C)) formed on the rotor core 3. This state is shown in FIG. 2 (A). The positioning of the temporary insertion portion 2-1 and the key hole 4 can be performed easily because the rotor winding 9 is not yet wound on the rotor core 3.

Next, the rotor winding 9 is wound on the rotor core 3, as shown in FIG. 2 (B). The rotor winding operation includes the attaching of the winding end to the commutator tongue 6. The rotor winding operation, including the attaching of the wiring end 10 to the commutator tongue 6, can be easily performed and adapted to automation because the commutator tongue 6 is positioned at a location higher than the winding height H. After the completion of the rotor winding operation, the winding end 10 is connected to the commutator tongue 6 by soldering, for example. (This connecting operation can also be automated.)

Upon completion of the connection of the winding end 10 to the commutator tongue 6, the commutator 1 is pushed toward the rotor core 3, using the commutator pushing jig 12, as shown in FIG. 2 (C). By pushing the commutator 1 toward the rotor core 3, the full insertion portion 2-1 of the projection 2 is inserted all the way into the key hole 4 until the commutator reference surface 11 (shown in FIG. 1 (A)) comes in contact with the rotor core 3. As described above, since the temporary insertion portion 2-1 at the tip of the projection 2 has been inserted into the key hole 4 before the commutator 1 is pushed toward the rotor core 3 by means of the commutator pushing jig 12, it is necessary to position the commutator 1 and the rotor core 3 again when pushing the commutator 1.

By following the processes described above by reference to FIGS. 2 (A) through (C), a desired rotor 8, as shown in FIG. 2 (C), is completed. The operations shown in FIGS. 2 (A) through (C) can be easily automated.

As described above, this invention makes it possible to provide a thin miniature motor by making the rotor thin, and to achieve labor saving through the automation of the winding operation of the rotor windings, and the attaching and connecting the winding ends to the commutator tongues.

What is claimed is:

1. A miniature motor having a rotor comprising a commutator having locating projections formed on a commutator reference surface which comes in contact with a rotor core, a rotor having locating key holes thereon for receiving said locating projections; said commutator being mounted on said rotor core by inserting said locating projections into said locating key holes until said commutator surface comes in contact with said rotor core, and characterized in that each of said locating projections has a temporary insertion portion having a crosssection smaller than the crosssection of each said locating key holes, and a full insertion portion for engaging with said locating key hole; said full insertion portion having such a length that commutator tongues of said commutator are located at a position higher than the height of rotor windings in a state where said temporary insertion portions are inserted in said locating key holes.

2. A miniature motor set forth in claim 1 wherein said commutator having said locating projections has a column, made of an insulating material, for engaging with a rotor shaft, commutator segments disposed on said column, an enlarged portion, made of an insulating material, connected to said column for holding said commutator tongues of said commutator segments, a washer for fitting said commutator tongues to said enlarged portion in a state where said commutator tongues are held in position, locating projections connected to said enlarged portion and extending in the axial direction of said rotor.

* * * * *